No. 799,410. PATENTED SEPT. 12, 1905.
C. E. SMITH.
REFRIGERATOR DRIP PAN.
APPLICATION FILED AUG. 19, 1903.
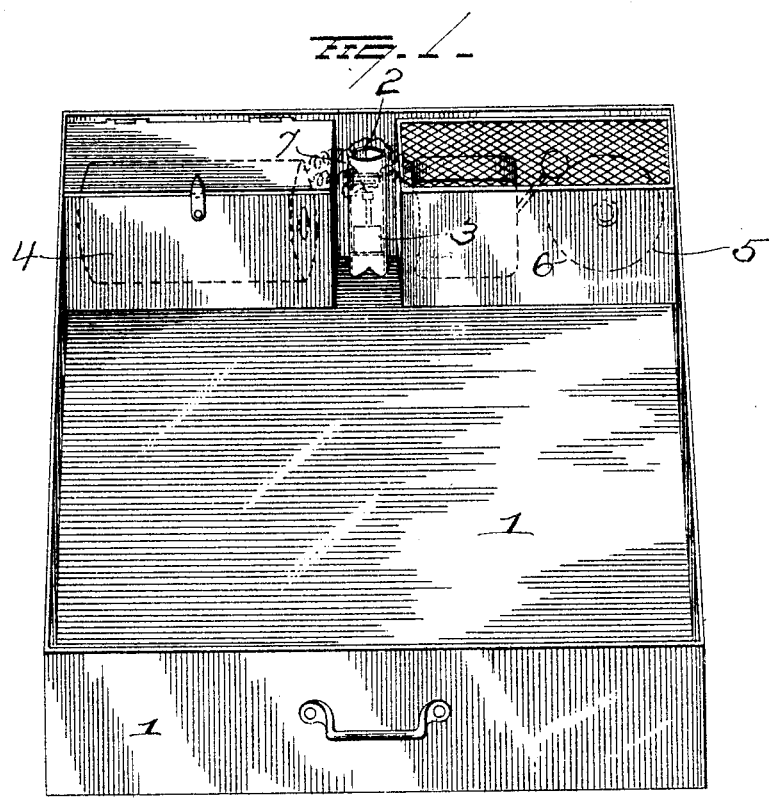
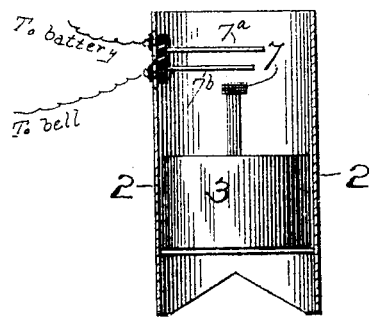
WITNESSES
INVENTOR
Charles E. Smith

UNITED STATES PATENT OFFICE.

CHARLES E. SMITH, OF MORRIS PARK, NEW YORK.

REFRIGERATOR DRIP-PAN.

No. 799,410.        Specification of Letters Patent.        Patented Sept. 12, 1905.

Application filed August 19, 1903. Serial No. 170,026.

*To all whom it may concern:*

Be it known that I, CHARLES E. SMITH, a resident of Morris Park, in the county of Queens and State of New York, have invented certain new and useful Improvements in Refrigerator Drip-Pans; and I do hereby declare the following to be a full, clear, and exact description of the invention, such as will enable others skilled in the art to which it appertains to make and use the same.

My invention relates to an improved refrigerator drip-pan, the object of the invention being to provide a drip-pan with improved signal or alarm mechanism which will be sounded when the water in the pan reaches a predetermined level in the pan, to be determined by the depth of the pan and its size, thus notifying persons of the fact that the pan is nearly to the overflow-point and giving them time to empty it.

With this object in view the invention consists in certain novel features of construction and combinations and arrangements of parts, as will be more fully hereinafter described, and pointed out in the claims.

In the accompanying drawings, Figure 1 is a perspective view illustrating my improvements, and Fig. 2 is a view showing portions removed.

1 represents an ordinary refrigerator drip-pan, and while I show a rectangular pan I would have it understood that it may be circular or other shape. To the inner wall of the pan a cylindrical guide 2 is secured and adapted to guide a float 3 in its vertical movement. To one side of this float a casing 4, with removable cover, is provided and adapted to contain cells of a dry or other battery, and in a similar casing 5 on the other side of the float 3 is located a bell or other alarm 6, electric-circuit-closing means 7 between the battery and bell being carried by the float, so that when the water rises in the pan to the danger-point the float will have risen to a point to close the electric circuit and sound the alarm. The circuit-closer comprises two fingers 7ª 7ᵇ, suitably insulated from each other and carried by the cylinder 2. One terminal of the battery is connected with one terminal of the bell-magnet coil, and the other terminal of the battery is connected with the finger 7ª, while the finger 7ᵇ is electrically connected with the other terminal of the bell-magnet coil, it being of course understood that the bell is provided with the usual rheotome included in the circuit.

It will be seen that with my improvements the pan carries the battery and bell, is always ready for use, and can be used on any form of refrigerator without altering or adding to the refrigerator, and when it is desired to remove the pan no electric connection need be broken and replaced when the pan is returned to position.

A great many slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a refrigerator-pan, of an electric bell, a battery carried by the pan, a float in the pan, a guide for said float located within the pan and a circuit-closer located within said guide in position to be operated by the float and included in circuit with the battery and bell.

2. The combination with a pan, and an electric bell and battery carried by said pan, of a tube or cylinder located within the pan and communicating at its bottom therewith, a circuit-closer located within said tube or cylinder and included in circuit with the battery and bell, and a float movable vertically in said tube or cylinder below the circuit-closer.

3. The combination with a pan, of two receptacles permanently located within the same, a battery in one receptacle and an electric bell in the other receptacle, a tubular guide located within the pan between said receptacles, and communicating at its bottom with the pan, a circuit-closer within said tubular guide, and a float in the tubular guide below the circuit-closer for operating the latter.

In testimony whereof I have signed this specification in the presence of two subscribing witnesses.

C. E. SMITH.

Witnesses:
   W. A. SMITH,
   JOHN THORNE.